W. H. SALYER.
Earth-Boring Machines.
No. 140,595. Patented July 8, 1873.
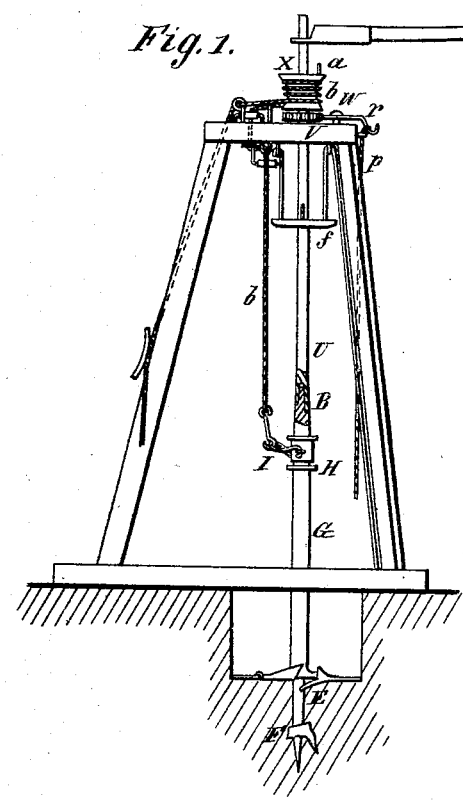
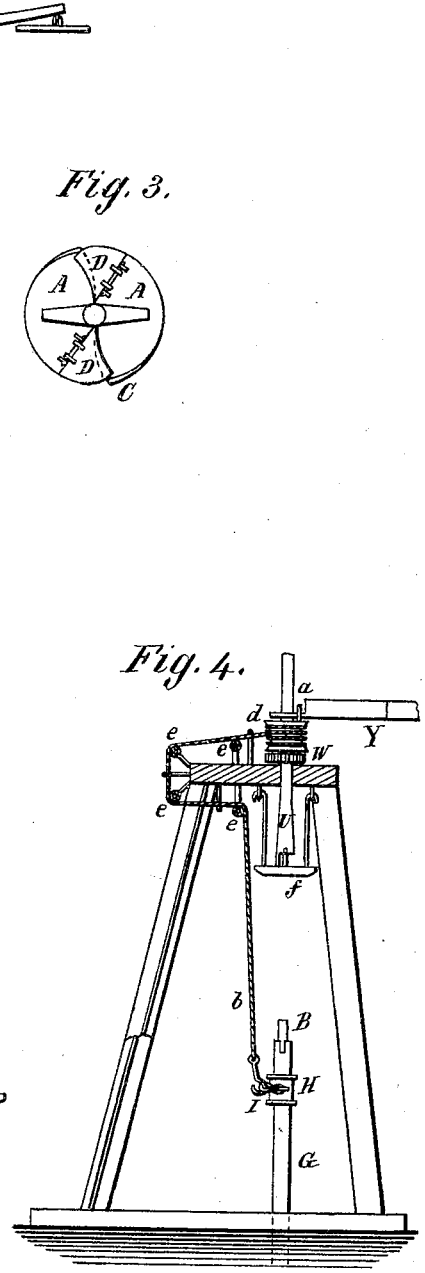
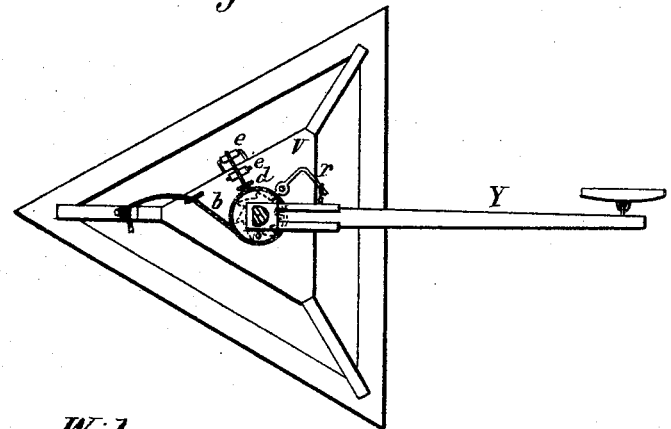
Witnesses
A. Bennensendaf
Francis McArdle
Inventor
W. H. Salyer
Per [signature]
Attorneys

UNITED STATES PATENT OFFICE.

WILLIAM H. SALYER, OF HAMBURG, IOWA, ASSIGNOR OF ONE HALF HIS RIGHT TO J. M. CAMPBELL AND DANIEL RITCHEY.

IMPROVEMENT IN EARTH-BORING MACHINES.

Specification forming part of Letters Patent No. 140,595, dated July 8, 1873; application filed November 11, 1871.

*To all whom it may concern:*

Be it known that I, WILLIAM H. SALYER, of Hamburg, in the county of Fremont and State of Iowa, have invented an Improved Well-Boring and Rock-Drilling Machine, of which the following is a specification:

My invention consists in certain improvements in apparatus for operating well-boring augers, as will be hereinafter described.

Figure 1 represents a side elevation of the auger and apparatus for operating it. Fig. 2 is a top or plan view of Fig. 1. Fig. 3 is a top or plan view of the auger. Fig. 4 is another side elevation of the auger-operating apparatus.

The auger which I preferably employ for boring consists of the horizontal plates A, with circular or slightly-eccentric edges, mounted on the vertical shaft B, and having the turned-up lips C, Fig. 3, at the corners of the cutting-bits; also the plates D hinged to the rear edges, the latter being for raising up to allow stones to pass up over the bits of the plates A behind, and then fall back again to the right position. The point E of the shaft is made round for turning easily in the ground, and the spiral or twisted blades or bits F are provided for drawing the blades A into the ground. The tube G around the auger-shaft conducts air down to the under sides of the blades to relieve them of atmospheric pressure, an opening being necessarily made at the lower end through one or both of the blades for the purpose. A short distance below the upper end of the shaft B, which is fitted for coupling with the driving-shaft above, (and sections are to be introduced for lengthening the connection,) I apply a swivel, H, with a fork or bail like connection, I, by which the hoisting-rope is attached for raising and lowering the auger. Inclosing the shaft, within the swivel, is a friction-sleeve, which rotates independently of the swivel. U represents the operating-shaft. It is mounted vertically in the top V of a triangular frame, so as to slide up and down, and has a ratchet-wheel, W, pulley or drum X, and a sweep, Y, arranged on it above the said frame, through all of which it can slide vertically; but, being flattened on one side, and the holes of said wheel, drum, and sweep correspondingly shaped, neither can turn independently of the other. The sweep is used to turn the auger by the power of a horse or other means, and has an eye or socket fitting on the shaft U, but sufficiently loose to permit it to be slid vertically thereon.

To commence boring the auger is set in proper position on the surface of the ground, and the sweep slid up on the shaft U until it arrives at a point as far above the drum X as it is intended the depth of the first bore of the auger shall be. The sweep retains its place by the friction or binding action due to its weight and horizontal position; and, being turned, causes the auger to penetrate the earth until, by reason of the corresponding descent of the shaft U, it comes in contact with the stud-pin *a* on the drum X.

In practice, I prefer to construct the drum with a toothed or roughened surface to give the rope or chain a proper bite. To connect with the swivel H of the auger-shaft the rope passes through the guide-eye *d* and over the pulleys *e*. The sweep, having come in contact with the stud-pin, is then stopped, the shaft U disconnected from the auger-shaft, or the sections connecting it with said auger-shaft, and lifted up and set on the sling *f* out of the way of the auger-shaft. The sweep is then set in motion, with the rope drawn tightly on the drum, which draws up the auger, which is then engaged by a hooked rod or other lifting device, forming part of a suitably-constructed derrick, which is to be employed for removing the auger in order to dump its load.

The frame and shaft U may be used for working a rock-drill, to be attached to said shaft, which, in this case, will be lifted and let fall, as ordinary rock-drills are worked, by any competent machinery, at which time the shaft will be turned horizontally by the ratchet-wheel W and a pawl, *n*, pivoted on the top of the former, and having a rope, *p*, hanging down from it, by which it may be worked.

Having thus described my invention, I claim as new and desire to secure by Letters Patent—

1. In combination with the shaft U, the sling $f$, substantially as and for the purpose specified.

2. The combination of the sweep Y, shaft U, drum X, stud-pin $a$, rope $b$, and shaft G, substantially as specified.

WILLIAM HENRY SALYER.

Witnesses:
JAMES P. BEACH,
JOHN W. BENNETT.